BALLPOINT PEN FOR WATER-SOLUBLE INK

Original Filed Sept. 18, 1967

United States Patent Office

Re. 27,636
Reissued May 1, 1973

27,636

BALLPOINT PEN FOR WATER-SOLUBLE INK

Yukio Horie, Tokyo-to, Japan, assignor to Dainihon Bungu Kabushiki Kaisha, Tokyo-to, Japan Original No. 3,446,564, dated May 27, 1969, Ser. No. 668,443, Sept. 18, 1967. Application for reissue Apr. 29, 1970, Ser. No. 32,962
Claims priority, application Japan, Mar. 31, 1967, 42/19,881
Int. Cl. B43k 7/02
U.S. Cl. 401—217 8 Claims

Matter enclosed in heavy brackets [ ] appears in the original patent but forms no part of this reissue specification; matter prinnted in italics indicates the additions made by reissue.

ABSTRACT OF THE DISCLOSURE

A pen outer barrel is filled directly with water-soluble ink, which is fed to the ball of a ballpoint and is air vented and pressure relieved by a device including an inner cylinder with a small vent hole, a gas-permeable structure, an ink absorber, and a cap plug having an air vent hole and capping the rear end of the barrel. The gas-permeable structure and absorber permit passage of air but respectively resist ink flow and absorb ink to prevent ink leakage out of the barrel.

This invention relates generally to ballpoint pens and more particularly to a new and improved ballpoint pen having highly desirable features for writing with water-soluble inks.

Heretofore, various kinds of ballpoint pens for writing with water-soluble inks have been proposed, but up to the present time, as far as I am aware, these pens have invariably been accompanied by one or more difficulties such as dripping of ink resulting in blotches, poor feeding of ink to the ball, and rapid depletion of ink.

It is an object of the present invention to provide a new ballpoint pen of high utility and performance in which these difficulties have been overcome.

More specifically, an object of the invention is to provide a ballpoint pen for water-soluble ink of simple construction which has a large ink storing capacity, uninterrupted and smooth, yet regulated, feeding of ink to the ball, and means whereby air venting with respect to the stored ink is accomplished, yet the ink is prevented from leaking out even under adverse conditions.

According to the present invention, briefly summarized, there is provided a ballpoint pen for water-soluble ink which has an outer holder barrel directly serving as an ink reservoir, a ball holder tightly fitted in and through the front end of the barrel and holding a ball at its front end and a wick in its interior, and an air venting and pressure relieving device consisting essentially of an inner cylinder, a stopper, an ink flow resisting device, an ink absorber, and a cap plug with a vent hole, which device has the functions of covering the rear end of the barrel, air venting the [varrel] *barrel* interior, that is permitting air to enter the barrel to maintain pressure equilibrium as the ink in the barrel is consumed, relieving increased pressure within the barrel due to abnormal impact or temperature rise by permitting some ink to overflow into the inner cylinder, and preventing this overflow ink from leaking out through the venting path.

The nature, principle, utility, and details of the invention will be more clearly apparent from the following detailed description with respect to preferred embodiments of the invention when read in conjunction with the accompanying drawing, in which like parts are designated by like reference numerals.

Figure 1:
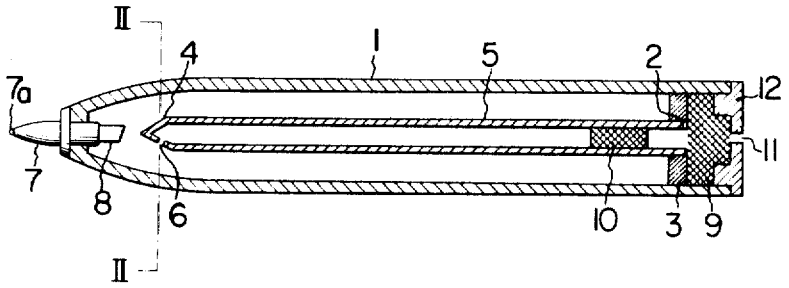
FIG. 1 is a side elevational view, in longitudinal section, showing the essential organization of a ballpoint pen embodying the invention.
Figure 2:
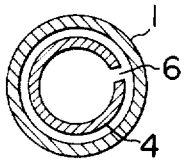
FIG. 2 is a cross sectional view taken along the plane indicated by the line II—II in FIG. 1.

Longitudinal directions herein referred to by the terms "front" and "rear" respectively designate directions toward and away from the pen writing point.

Referring to the drawing, the ballpoint pen shown therein has a holder barrel 1 constituting an outer casing and provided near its rear end with an ink stopper 3 fitted into the hollow interior of the barrel 1 and having a central hole 2. The stopper 3 coaxially supports, within the barrel 1, an inner cylinder 5 tightly fitted at its rear end into and through the hole 2 and having a closed front end 4 which has a sharp front tip. The front end 4 has near its front tip a small diameter, air-vent hole 6.

A hollow ballpoint holder 7, rotatably holding at its front end a ball 7a, is tightly fitted at its rear end into and through the front end of the barrel 1 and contains a wick 8 inserted into the interior through the rear end thereof for the purpose of feeding ink in a regulated manner to the ball 7a.

Near the rear end of the inner cylinder 5, there is inserted a gas-permeable plug 10 made of a sponge-like material, a fibre bundle, or the like, preferably a water repellent material made of a silicone resin. A gas-permeable absorber material 9 is disposed to the rear of the stopper 3 and is prevented from contacting the gas-permeable plug 10. A cap plug 12 is fitted into the rear end of the barrel 1 and has a central air-vent hole 11.

The ballpoint pen of the above described organization according to the invention operates in the following manner.

First, the barrel 1 is filled with water-soluble ink through the front end of the barrel (with the ball holder 7 removed), and then the ball holder 7 is tightly fitted into the barrel front end. The ink then occupying the space between the barrel 1 and the inner cylinder 5 is transferred and regulated by the wick 8 to reach the ball 7a, whereupon the pen is ready for writing.

As the ink is consumed, the outside air enters through the rear air vent hole 11 and, passing through the gas-permeable absorber material 9 and the gas-permeable plug 10, enters through the narrow hole 6 into the interior of the barrel 1 thereby to facilitate the smooth feeding of the ink.

Since the narrow hole 6 is very small, the ink within the barrel 1 does not readily flow into the inner cylinder 5, and leakage of the very slight amount of ink which normally enters the inner cylinder 5 is resisted by the gas-permeable plug 10 and furthermore is absorbed by the absorber material 9 whereby the ink is prevented from leaking out from the rear end of the barrel 1 through the rear vent hole 11.

Figure 3:
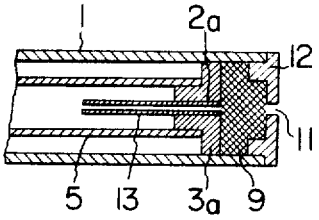
FIG. 3 is a fragmentary side elevational view, in longitudinal section, showing another embodiment of the invention.

In another embodiment of the invention illustrated in FIG. 3, a thin tube 13 is used in place of the gas-permeable plug 10 of the preceding example illustrated in FIG. 1. The thin tube 13 is fitted at its rear end into and through a stopper 3a having a projecting plug part which is fitted into the rear end of the inner cylinder 5. In all other features of organization, this ballpoint pen is identical to the pen described hereinabove and illustrated in FIG. 1.

By the organization of the ballpoint pen according to the present invention as described above, several advantageous features are afforded as follows. Since the ink is charged directly into the interior of the barrel, the quantity of the ink which can be stored is large, whereby the total opisometric writing distance between charges is long. Furthermore, the ink is fed continuously to the ballpoint by its own hydrostatic head and thereby is fed steadily and smoothly, whereby interrupted writing due to breaks in the ink film on the ball is prevented.

Another feature of the instant pen is that, when the ink in the barrel is subjected to a severe physical impact or expands because of a temperature rise, the resulting excessive pressure is relieved by the escape of some ink through the small hole 6 into the inner cylinder 5, whereby accidental leakage of the ink to the outside is prevented. Furthermore, the gas-permeable plug 10 functions to brake abrupt flow of the ink within the inner cylinder 5 and, further, provides resistance to the migration of the ink toward the gas-permeable absorber material 9.

A further feature of the ballpoint pen of the invention resides in the sharp front tip 4 of the inner cylinder 5 whereby, when ink is being charged into the barrel by means of a hypodermic syringe and needle, the tip of the needle is deflected laterally by the front tip 4, and closing of the needle outlet opening by the inner cylinder surface is thereby prevented. Accordingly, charging of the ink is facilitated.

Figure 4:
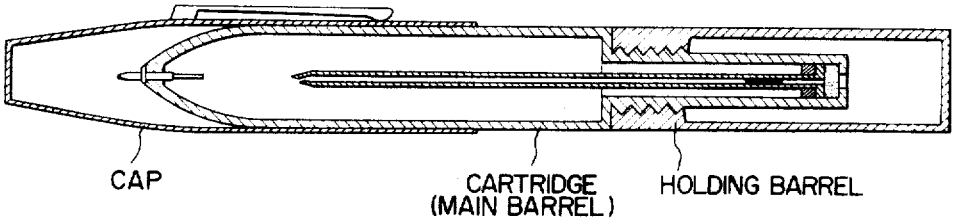
FIG. 4 is a longitudinal section of the ballpoint pen of this invention wherein the holder barrel is indicated as a cartridge type.

In actual use, the main holder barrel of the ballpoint pen is shaped as shown in FIG. 4. That is, the front part of the main barrel is as same as the shape of ordinary writing pens for the sake of convenience in holding the same at the time of writing, and the rear part of it is reduced in dameter. To this rear part of reduced diameter of the main barrel, a holding barrel having the same diameter as the front part thereof is fitted by means of a screw thread or any other appropriate manner. The writing point of the pen is protected by a cap. Thus, when the ink in the main barrel is used up completely, this main barrel is discarded by being removed from the holding barrel and replaced with a new barrel. In other words, the main barrel is designed to be of a replaceable cartridge type to save trouble in filling ink in the barrel.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. A ballpoint pen for water-soluble ink comprising an outer, hollow, holder barrel serving as a case and a reservoir for ink; a stopper having a central hole, said stopper being tightly fitted in the interior of the barrel near the rear end thereof; an inner cylinder having a rear end tightly fitted [into and through said central hole] *on said stopper and extending substantially throughout said barrel* and having a closed front end with a small air-vent hole therein; resistance means in the form of a thin tube fitted at the rear end thereof into and through said stopper *and located within said inner cylinder,* said resistance means permitting passage of air therethrough but resisting passage of ink; a gas-permeable ink absorber fitted in the interior of the barrel rearwardly of the stopper; a cap plug having a central air-vent hole fitted into the rear end of the barrel; and a ball holder tightly fitted in and through the front end of the barrel forwardly of said closed front end of the inner cylinder and holding a ball at the front tip thereof and a wick for controllably feeding ink fro mthe barrel interior to the ball.

2. A ballpoint pen as claimed in claim 1 in which said gas-permeable ink absorber is a porous water-repellent structure made of a silicone resin.

*3. A pen construction comprising an elongated hollow casing adapted for serving as an ink reservoir and having openings at opposite ends thereof, ink applying means seated in one of said ends and including a wick extending into said casing, an ink stopper seated inside said casing towards the other of said ends and provided with an opening therethrough, a relatively thin hollow inner cylinder supported by said stopper and extending substantially throughout the casing towards said wick, said inner cylinder including an end proximate but spaced from said wick and being provided with a constantly open air vent hole at the latter said end, an unimpeded fluid and air path being provided between said wick and air vent hole a gas-permeable ink absorber material on said stopper within said casing between said stopper and said other end of the casing, said ink absorber material being free of connection with the stopper and being on one side of the latter only and a cap plug in said other end of the casing retaining the ink absorber material therein and provided with an opening allowing the admission of ambient air into the casing for passage through said material, stopper and inner cylinder.*

*4. A pen construction as claimed in claim 3 comprising ink flow resisting means in said inner cylinder.*

*5. A pen construction as claimed in claim 4 wherein said ink flow resisting means is a gas permeable plug.*

*6. A pen construction as claimed in claim 4 wherein said means is a relatively thin tube supported by said stopper within said inner cylinder.*

*7. A pen construction as claimed in claim 3 wherein said ink absorber material is a fibre bundle.*

*8. A pen construction as claimed in claim 7 wherein said bundle is of silicone resin.*

References Cited

The following references, cited by the Examiner, are of record in the patented file of this patent or the original patent.

UNITED STATES PATENTS

| | | | |
|---|---|---|---|
| 1,980,625 | 11/1934 | Leforest | 401—217 |
| 2,654,108 | 10/1953 | Scelsi | 401—209 |
| 2,847,975 | 8/1958 | Lawton | 401—217 |
| 3,125,071 | 3/1964 | Nakada | 401—217 |

FOREIGN PATENTS

| | | |
|---|---|---|
| 507,266 | 12/1951 | Belgium. |
| 806,331 | 6/1951 | Germany. |
| 248,282 | 7/1966 | Austria. |

ROBERT W. MICHELL, Primary Examiner